United States Patent
Sohn et al.

(10) Patent No.: US 10,270,116 B2
(45) Date of Patent: Apr. 23, 2019

(54) HIGH-TEMPERATURE POLYMER ELECTROLYTE MEMBRANE FUEL CELL STACK HAVING INDEPENDENT COOLING PLATE AND METHOD OF PRODUCING THE SAME

(71) Applicant: Korea Institute of Energy Research, Daejeon (KR)

(72) Inventors: Young-Jun Sohn, Daejeon (KR); Minjin Kim, Daejeon (KR); Seung-Gon Kim, Daejeon (KR); Gu-Gon Park, Daejeon (KR); Byungchan Bae, Daejeon (KR); Sung-Dae Yim, Daejeon (KR); Seok-Hee Park, Daejeon (KR); Tae-Hyun Yang, Daejeon (KR); Won-Yong Lee, Daejeon (KR); Chang-Soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/434,110

(22) Filed: Feb. 16, 2017

(65) Prior Publication Data
US 2017/0237087 A1    Aug. 17, 2017

(30) Foreign Application Priority Data
Feb. 16, 2016    (KR) .................. 10-2016-0017834

(51) Int. Cl.
*H01M 8/00*    (2016.01)
*H01M 8/124*    (2016.01)
(Continued)

(52) U.S. Cl.
CPC ......... *H01M 8/124* (2013.01); *H01M 8/0267* (2013.01); *H01M 8/04074* (2013.01); *H01M 8/2404* (2016.02); *H01M 8/2428* (2016.02); *H01M 8/2457* (2016.02); *H01M 8/2483* (2016.02); *H01M 2008/1095* (2013.01); *Y02P 70/56* (2015.11)

(58) Field of Classification Search
CPC .......... H01M 8/04007; H01M 8/2428; H01M 8/2457; H01M 8/248; H01M 8/124
See application file for complete search history.

(56) References Cited

U.S. PATENT DOCUMENTS

| | | | | |
|---|---|---|---|---|
| 6,042,955 A | * | 3/2000 | Okamoto | ............ H01M 8/0228 429/413 |
| 2010/0173209 A1 | * | 7/2010 | Jayaraman | ........ H01M 8/04029 429/428 |

FOREIGN PATENT DOCUMENTS

| | | |
|---|---|---|
| EP | 1160904 A2 | 12/2001 |
| JP | 07-326378 | 12/1995 |

(Continued)

*Primary Examiner* — Cynthia H Kelly
*Assistant Examiner* — Monique M Wills
(74) *Attorney, Agent, or Firm* — Dorsey & Whitney LLP (57) ABSTRACT

A high-temperature polymer electrolyte membrane fuel cell stack may include a plurality of cell units; a cooling assembly including a plurality of first independent cooling plates disposed on top surfaces of the plurality of cell units, respectively, and a plurality of second independent cooling plates disposed on bottom surfaces of the plurality of cell units, respectively; and a support assembly configured to support the plurality of cell units and the cooling assembly.

9 Claims, 7 Drawing Sheets

(51) Int. Cl.
*H01M 8/2428* (2016.01)
*H01M 8/2457* (2016.01)
*H01M 8/0267* (2016.01)
*H01M 8/04007* (2016.01)
*H01M 8/2483* (2016.01)
*H01M 8/2404* (2016.01)
*H01M 8/1018* (2016.01)

(56) References Cited

FOREIGN PATENT DOCUMENTS

| | | |
|---|---|---|
| JP | 11-204129 | 7/1999 |
| JP | 2012-178302 | 9/2012 |
| KR | 10-1187114 B | 8/2011 |
| KR | 1020120012303 A | 2/2012 |
| KR | 1020120051496 A | 5/2012 |

\* cited by examiner

FIG. 9

HIGH-TEMPERATURE POLYMER ELECTROLYTE MEMBRANE FUEL CELL STACK HAVING INDEPENDENT COOLING PLATE AND METHOD OF PRODUCING THE SAME

CROSS REFERENCE TO RELATED APPLICATIONS

This application claims the priority benefit of Korean Patent Application No. 10-2016-0017834 filed on 16 Feb. 2016, in the Korean Intellectual Property Office, the disclosure of which is hereby incorporated by reference herein.

TECHNICAL FIELD

The technology described herein relates to a high-temperature polymer electrolyte membrane fuel cell stack having an independent cooling plate and a method of producing the same.

BACKGROUND

A fuel cell has advantages, such as high efficiency, environment friendliness, high output density, and the like, and also has gained great attention as promising future clean energy technology. An existing low-temperature polymer electrolyte membrane fuel cell (LT-PEMFC) experiences difficulty in its commercialization due to some reasons. A water management system, for example, a humidifier, a water trap, etc., may be used to operate the low-temperature polymer electrolyte membrane fuel cell. In addition, the fuel supply is difficult and hydrogen having a relatively low concentration for specific impurity is to be used. The heat obtainable by operating the low-temperature polymer electrolyte membrane fuel cell has a low exhaust heat temperature and thus, can be limitedly used. As an alternative of the low-temperature polymer electrolyte membrane fuel cell, research on a high-temperature polymer electrolyte membrane fuel cell (HT-PEMFC) is actively ongoing. The high-temperature polymer electrolyte membrane fuel cell may use a polybenzimidazole (PBI)-based electrolyte membrane on which phosphoric acid is doped and may be operable without using separate humidification. In addition, since water generated by the operation of the fuel cell occurs in a form of vapor, a separate water trap is not required. Also, if the high-temperature polymer electrolyte membrane fuel cell is at an operation temperature of 150 to 180° C., poisoning of CO may occur. A performance degradation phenomenon of a membrane electrode assembly (MEA) by such poisoning of CO may be remarkably reduced. Accordingly, the high-temperature polymer electrolyte membrane fuel cell may be resistant up to CO concentration of 3%. Due to the above phenomenon, a CO removal process may be reduced, or alternatively, minimized during a hydrogen reforming process. Also, since a high exhaust heat temperature close to 100° C. may be obtained, thermal energy may be variously available.

However, further developments are still required for the high-temperature polymer electrolyte membrane fuel cell. Theoretically, the high-temperature polymer electrolyte membrane fuel cell has a high electrochemical reaction speed. However, the performance of the actually developed high-temperature polymer electrolyte membrane fuel cell does not reach the performance of the low-temperature polymer electrolyte membrane fuel cell. Due to harsh operating conditions, for example, exposure to phosphoric acid and high temperature, the high-temperature polymer electrolyte membrane fuel cell has a vulnerable durability and a relatively short cell life.

For example, if a portion of the fuel cell is damaged under a high temperature operating condition, a refrigerant may permeate a membrane electrode assembly (MEA) and the performance of the fuel cell may be degraded. Also, oil used as a refrigerant of a high-temperature polymer electrolyte membrane fuel cell stack has a relatively high viscosity. Thus, the oil may cause a high differential pressure in a circulating path, which may also lead to damaging the fuel cell. The oil used as the refrigerant of the high-temperature polymer electrolyte membrane fuel cell stack acts at a high temperature, which may trigger a change in a volume of a separating plate while circulating a refrigerant flow path formed in the separating plate of the fuel cell and may escalate damage.

The information included in this Background section of the specification, including any references cited herein and any description or discussion thereof, is included for technical reference purposes only and is not to be regarded subject matter by which the scope of the invention as defined in the claims is to be bound.

SUMMARY

At least one example embodiment provides a high-temperature polymer electrolyte membrane fuel cell stack having an excellent durability and assembly, and may be easily maintained and repaired.

According to an aspect of at least one example embodiment, there is provided a high-temperature polymer electrolyte membrane fuel cell stack including a plurality of cell units; a cooling assembly including a plurality of first independent cooling plates disposed on top surfaces of the plurality of cell units, respectively, and a plurality of second independent cooling plates disposed on bottom surfaces of the plurality of cell units, respectively; and a support assembly configured to pressurize and support the plurality of cell units and the cooling assembly.

The cell unit may be configured by stacking a plurality of separating plates.

Each of the plurality of separating plates may include a hydrogen flow path through which hydrogen flows and an air flow path through which air flows, and may not include a refrigerant flow path through which a refrigerant flows.

The cooling assembly may further include a first refrigerant inflow passage configured to guide a refrigerant that flows in each of the plurality of first independent cooling plates; a first refrigerant outflow passage configured to guide a refrigerant that flows out from each of the plurality of first independent cooling plates; a second refrigerant inflow passage configured to guide a refrigerant flows in each of the plurality of second independent cooling plates; and a second refrigerant outflow passage configured to guide a refrigerant that flows out from each of the plurality of second independent cooling plates.

The first refrigerant inflow passage and the first refrigerant outflow passage may be disposed in an elongated shape along a direction in which the plurality of cell units is stacked, and the second refrigerant inflow passage and the second refrigerant outflow passage may be disposed in an elongated shape along the direction in which the plurality of cell units is stacked, and disposed on a side that faces the first refrigerant inflow passage and the first refrigerant outflow passage.

The first independent cooling plate may include a first protrusion that does not overlap the cell unit based on a direction in which the cell unit is stacked, and the first refrigerant inflow passage and the first refrigerant outflow passage may be connected to the first protrusion.

The second independent cooling plate may include a second protrusion that does not overlap the cell unit based on the direction in which the cell unit is stacked, and the second refrigerant inflow passage and the second refrigerant outflow passage may be connected to the second protrusion.

The first protrusion and the second protrusion may be configured to not overlap based on the direction in which the cell unit is stacked.

Each of the first independent cooling plate and the second independent cooling plate may be formed using a metal material having a strength greater than a material of the cell unit.

The cooling assembly may further include a refrigerant hose disposed between two adjacent first independent cooling plates and formed using a flexible material.

Each of the two adjacent first independent cooling plates may include a body in a planar shape; an upper refrigerant port configured to extend upward from the body; and a lower refrigerant port configured to extend downward from the body. The refrigerant hose may be configured to connect the lower refrigerant port of one first independent cooling plate and the upper refrigerant port of the other first independent cooling plate between the two adjacent first independent cooling plates.

In a state in which the plurality of cell units and the cooling assembly are pressurized by way of the support assembly, a distance between the body of the one first independent cooling plate and an end of the upper refrigerant port of the other first independent cooling plate may be greater than a length of the refrigerant hose.

Each of the two adjacent first independent cooling plates may include a fixture provided to each of the upper refrigerant port and the lower refrigerant port and configured to fix the refrigerant hose.

In a state in which the plurality of cell units and the cooling assembly are pressurized by way of the support assembly, a distance between the fixture provided to the lower refrigerant port of the one first independent cooling plate and the fixture provided to the upper refrigerant port of the other first independent cooling plate may be less than a length of the refrigerant hose.

According to another aspect of at least one example embodiment, there is provided a method of producing a high-temperature polymer electrolyte membrane fuel cell stack, the method including providing a first end plate; alternately disposing, on the first end plate, a plurality of cell units each configured by stacking a plurality of separating plates, and a plurality of independent cooling plates; providing a second end plate after the stacking; combining and pressurizing a support assembly for pressurizing and supporting the first end plate and the second end plate; and connecting a refrigerant hose that connects between a portion of the plurality of independent cooling plates, and formed using a flexible material.

The cell unit may include a hydrogen flow path through which hydrogen flows and an air flow path through which air flows, and may not include a refrigerant flow path through which a refrigerant flows.

According to example embodiments, dissimilar to forming a refrigerant flow path inside of a separating plate of a fuel cell according to the related art, it is possible to enhance a durability by using an independent cooling plate separate from the separating plate. Also, since a refrigerant hose configured to guide a refrigerant to the independent cooling plate may be formed using a flexible material, it is possible to compensate for a deviation according to a volume expansion and contraction occurring during an operation of a high-temperature polymer electrolyte membrane fuel cell, and thereby to further reduce a risk of damage. In addition, it is possible to further simplify assembling of the high-temperature polymer electrolyte membrane fuel cell and, at the same time, to easily maintain and repair the high-temperature polymer electrolyte membrane fuel cell after the assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, a description made in one example embodiment may be applicable to another example embodiment and a detailed description within a duplicate range is omitted.

Figure 1:
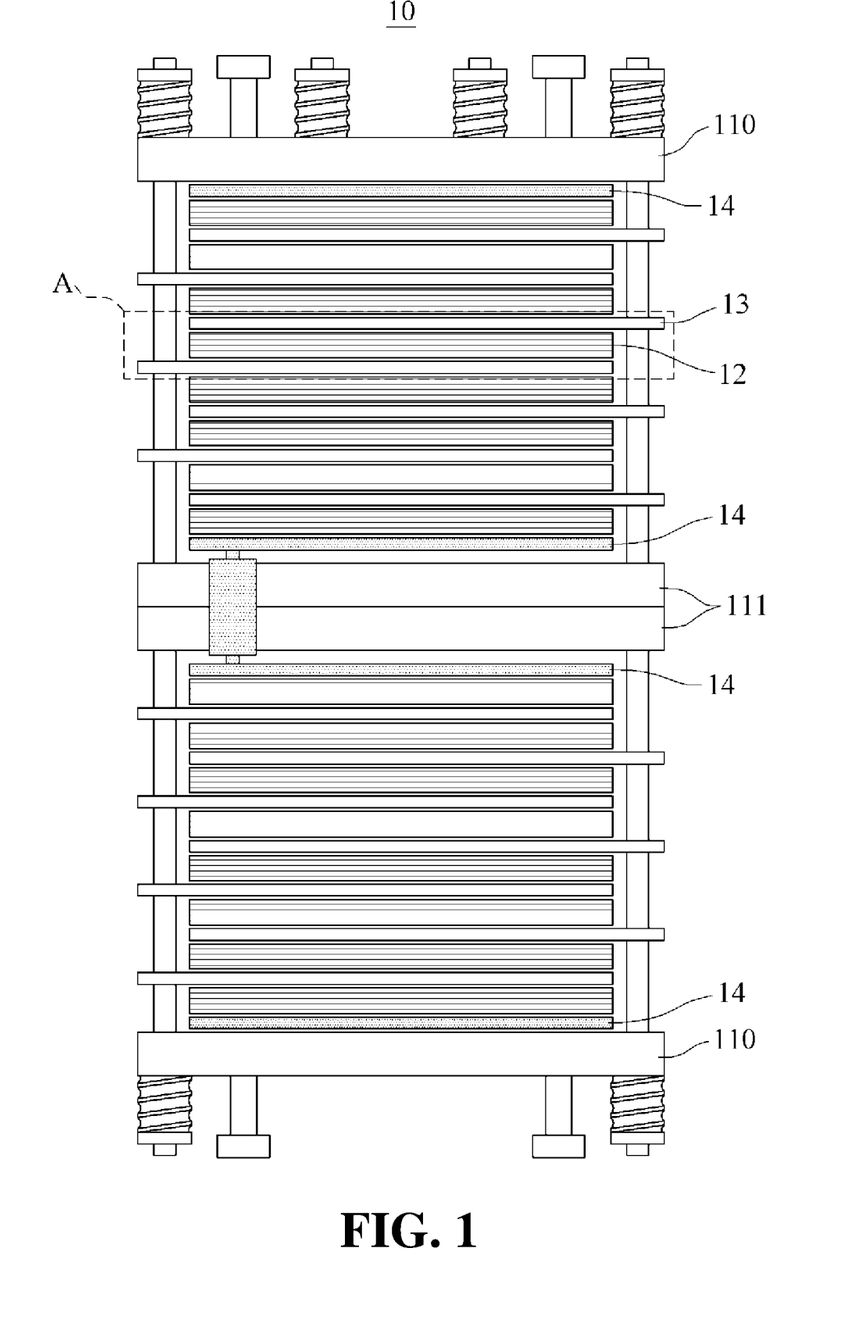
FIG. 1 is a front view of a high-temperature polymer electrolyte membrane fuel cell stack according to an example embodiment.
Figure 2:
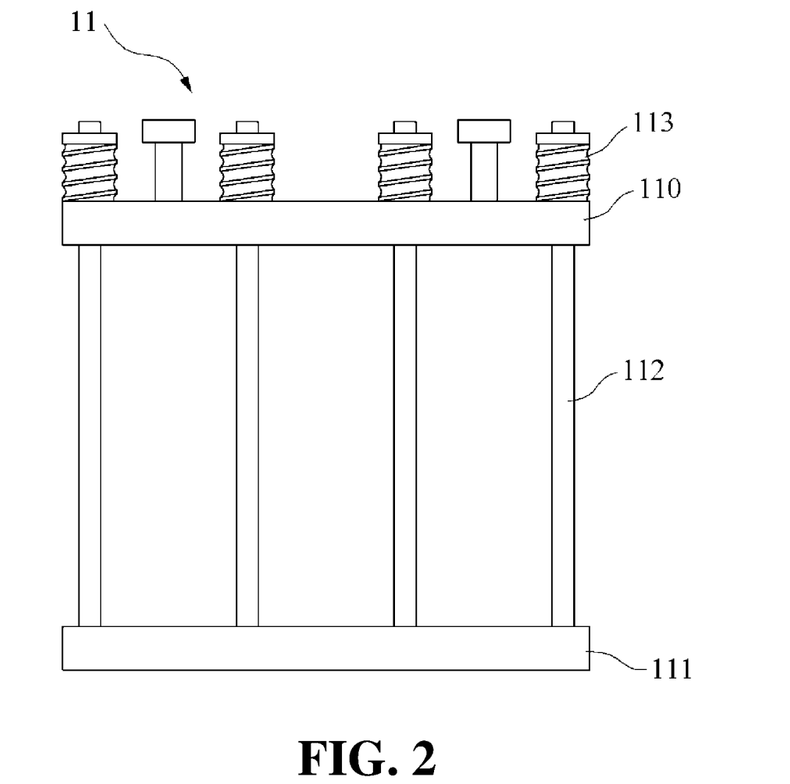
FIG. 2 illustrates a support assembly included in a high-temperature polymer electrolyte membrane fuel cell stack according to an example embodiment.
Figure 3:
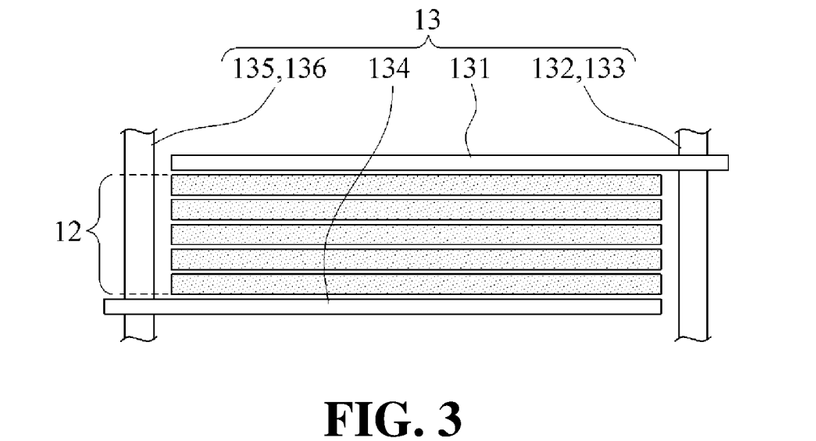
FIG. 3 illustrates a cell unit and a cooling plate included in a high-temperature polymer electrolyte membrane fuel cell stack according to an example embodiment.

FIG. 1 is a front view of a high-temperature polymer electrolyte membrane fuel cell stack according to an example embodiment, FIG. 2 illustrates a support assembly included in a high-temperature polymer electrolyte membrane fuel cell stack according to an example embodiment, and FIG. 3 illustrates a cell unit and a cooling plate included in a high-temperature polymer electrolyte membrane fuel cell stack according to an example embodiment. In FIG. 3, a clamping bar 112 in a portion A of FIG. 1 is omitted.

Figure 4:
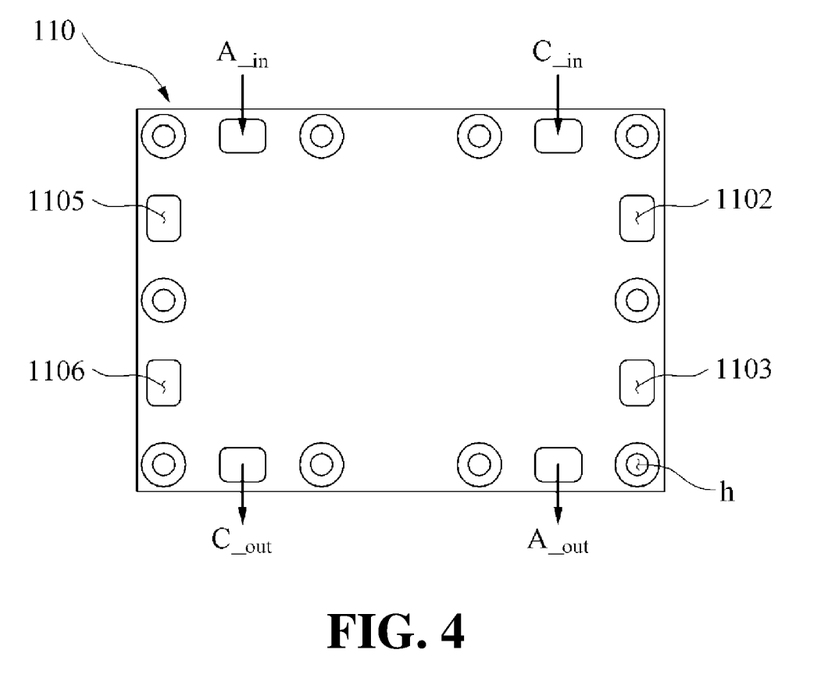
FIG. 4 is a top view of an end plate according to an example embodiment.
Figure 5:
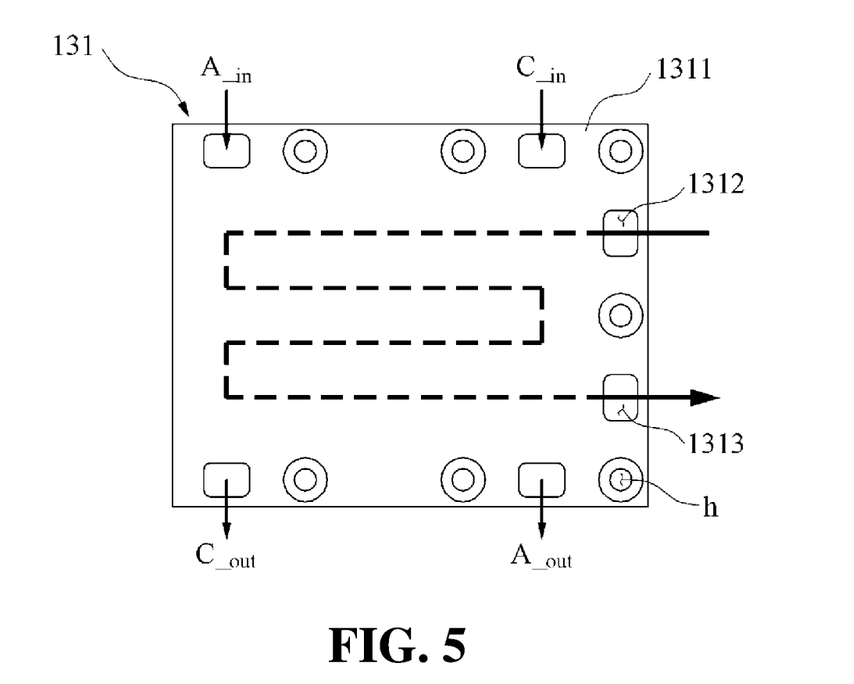
FIG. 5 is a top view of a first independent cooling plate according to an example embodiment.
Figure 6:
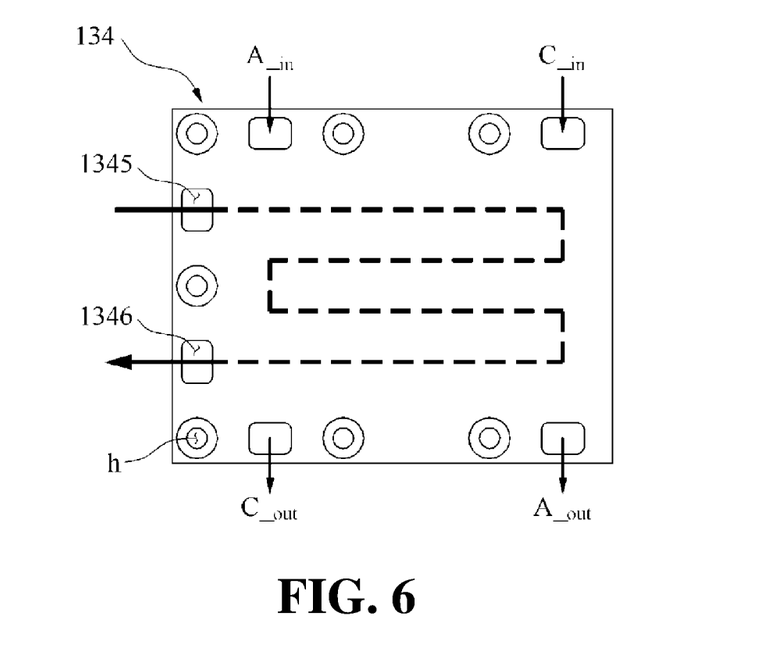
FIG. 6 is a top view of a second independent cooling plate according to an example embodiment.

FIG. 4 is a top view of an end plate according to an example embodiment, FIG. 5 is a top view of a first independent cooling plate according to an example embodiment, and FIG. 6 is a top view of a second independent cooling plate according to an example embodiment.

Referring to FIGS. 1 through 6, a high-temperature polymer electrolyte membrane fuel cell stack (hereinafter, referred to as high-temperature PEMFC stack) 10 may include a support assembly 11, a cell unit 12, a cooling assembly 13, and a current collector 14 configured to provide a produced current to an outside.

The support assembly 11 may support and pressurize a plurality of cell units 12 and the cooling assembly 13. The support assembly 11 may include an end plate 110, a middle end plate 111, a clamping bar 112, and a relief spring 113.

The end plate 110 is a plate configured to couple with each of both ends of the high-temperatures PEMFC stack 10, and may pressurize other configurations disposed between two end plates 110. The end plate 110 may include a first refrigerant inflow port 1102 through which a first refrigerant inflow passage 132 configured to guide a refrigerant that flows in a first cooling plate 131 passes, a first refrigerant outflow port 1103 through which a first refrigerant outflow passage 133 configured to guide a refrigerant that flows out from the first cooling plate 131 passes, a second refrigerant inflow port 1105 through which a second refrigerant inflow passage 135 configured to guide a refrigerant that flows in a second cooling plate 134 passes, a second refrigerant outflow port 1106 through which a second refrigerant outflow passage 136 configured to guide a refrigerant that flows out from the second cooling plate 134 passes, an anode inflow port A_in configured to guide hydrogen that flows in the cell unit 12, a cathode inflow port C_in configured to guide air that flows in the cell unit 12, an anode outflow port A_out configured to guide hydrogen that flows out from the cell unit 12, a cathode outflow port C_out configured to guide air that flows out from the cell unit 12, and a clamping hole h through which the clamping bar 112 penetrates.

The end plate 110 may be provided in, for example, a rectangular shape to achieve the optimal spatial use. In this case, the first refrigerant inflow port 1102 and the first refrigerant outflow port 1103 may be formed on one side of the end plate 110, and the second refrigerant inflow port 1105 and the second refrigerant outflow port 1106 may be formed on the other side of the end plate 110. For example, the first refrigerant inflow port 1102 and the first refrigerant outflow port 1103 may be disposed on a side that faces the second refrigerant inflow port 1105 and the second refrigerant outflow port 1106.

A plurality of clamping holes h may be disposed to be separate apart from each other along the periphery of the end plate 110. Each single clamping hole h may be formed at each corner of the end plate 110. Also, one or more clamping holes h may be formed between corners.

The middle end plate 111 is a plate disposed at a center portion between the two end plates 110 and may further enhance a fixing force. The high-temperature PEMFC stack 10 operates at a high temperature and thus, has a relatively high thermal expansion compared to a low-temperature PEMFC stack. Accordingly, due to the thermal expansion, a separating plate that constitutes the cell unit 12 may have a relatively high risk of being damaged. To prevent the damage, a thickness of the separating plate may be increased. If the separating plate becomes thick, a sufficient fixing force may not be achieved using the two end plates 110 alone. Accordingly, the fixing force may be enhanced by additionally disposing the middle end plate 111 at a location corresponding to the center portion between the two end plates 110.

The clamping bar 112 may be provided between the two end plates 110 or may be provided between the end plate 110 and the middle end plate 111, thereby fixing configurations disposed between the two end plates 110. The clamping bar 112 may be provided to penetrate at least a portion of the configurations disposed between the two end plates 110 and to align the corresponding configurations.

The relief spring 113 is provided at an end of the clamping bar 112 and may pressurize configurations disposed between the two end plates 110 or between each end plate 110 and the middle end plate 111. The pressure may be distributed to be constant on the separating plate of the cell unit 12 by adjusting a location and a length of the relief spring 113.

The cell unit 12 may be configured by stacking a plurality of separating plates. For example, the cell unit 12 may be configured by stacking five separating plates. In one example, the cell unit 12 may be understood as a collective body of separating plates positioned between two cooling plates, for example, the first independent cooling plate 131 and the second independent cooling plate 134. A plurality of cell units 12 may be stacked in a vertical direction. The entire output of the high-temperature PEMFC stack 10 may be determined based on a number of cell units 12.

Each of the separating plates that constitute the cell unit 12 may include a hydrogen flow path through which hydrogen flows and an air flow path through which air flows, and may not include a refrigerant flow path through which a refrigerant flows. Instead of forming the refrigerant flow path on the cell unit 12, a cooling function may be performed through the cooling assembly 13 using an independent cooling plate. It will be described below.

The cooling assembly 13 is configured to remove the heat generated from the high-temperature PEMFC stack 10, and may remove the heat generated from the cell unit 12 by moving the refrigerant using an external manifold scheme. Instead of inserting a cooling plate between the respective separating plates to prevent a significant increase in the entire thickness of the high-temperature PEMFC stack 10, the cooling plates, for example, the first independent cooling plate 131 and the second independent cooling plate 134, may be, respectively, provided on a top surface and a bottom surface of the cell unit 120 including the plurality of separating plates based on a thickness of separating plates that constitute the cell unit 12.

The cooling assembly 13 may include a plurality of first independent cooling plate 131 disposed on top surfaces of the plurality of cell units 12, respectively, a first refrigerant inflow passage 132 configured to guide a refrigerant that flows in each of the plurality of first independent cooling plates 131, a first refrigerant outflow passage 133 configured to guide a refrigerant that flows out from each of the plurality of first independent cooling plates 131, a plurality of second independent cooling plates 134 disposed on bottom surfaces of the plurality of cell units 12, respectively, a second refrigerant inflow passage 135 configured to guide a refrigerant that flows in each of the plurality of second independent cooling plates 134, and a second refrigerant outflow passage 136 configured to guide a refrigerant that flows out from each of the plurality of second independent cooling plates 134.

Each of the first independent cooling plate 131 and the second independent cooling plate 134 may be formed using a metal material, for example, stainless steel, having a strength than a material of the cell unit 12. In this case, compared to an existing cooling plate, the cooling plates, for example, the first independent cooling plate 131 and the second independent cooling plate 134, may have an enhanced mechanical strength. Accordingly, it is possible to prevent a damage to the cooling plate under a high temperature operating condition.

In the related art, an internal manifold cooling structure is provided by integrally forming a cooling flow path inside of a separating plate. In this case, the cooling flow path may be damaged due to a high temperature operating condition and a refrigerant may be leaked, which may lead to degrading the performance. Also, a graphite board including a mixture of a porous material and engineering plastic that fills the porous medium may be used for the separating plate. In this case, it may not become a serious issue since water having a high surface tension is used for a low-temperature PEMFC stack. However, since old having a high boiling point is used as a refrigerant in the high-temperature PEMFC stack, the oil may permeate the separating plate including a heterogeneous material due to a high temperature and a low surface tension of the oil, and the performance may be significantly degraded. However, in the example embodiments, an external manifold cooling scheme is employed to prevent each separating plate of the cell unit 12 from including a refrigerant flow path. Also, using an independent cooling plate formed using a metal material having a high mechanical strength, it is possible to significantly decrease a risk of damage to the separating plate. Also, although the damage occurs, it is possible to prevent a refrigerant from directly flowing in a separating plate. Accordingly, durability may be significantly enhanced.

In an example in which the cooling plate 131, 134 and the cell unit 12 are formed using different materials, contact resistance between both surfaces may increase compared to an example in which the cooling plate 131, 134 and the ceiling unit 12 are formed using the same material. Accordingly, a buffering layer may be inserted between the cooling plate 131, 134 and the cell unit 12 to decrease the contact resistance. That is, the high-temperature PEMFC stack 10 may further include a first buffering layer disposed between the first independent cooling plate 131 and the top surface of the cell unit 12 and a second buffering layer disposed between the second independent cooling plate 134 and the bottom surface of the cell unit 12. Here, each of the first buffering layer and the second buffering layer may be formed using a material having a high conductivity and flexibility.

For example, the buffering layer may be a gas diffusion layer (GDL), a gas diffusion layer on which a micro porous layer (MPL) is stacked, a layer formed using Grafoil, or a layer formed using a metal foam.

The gas diffusion layer may be formed using a porous carbon material, such as carbon cloth or carbon paper including carbon fiber, etc. The gas diffusion layer has an excellent electrical conductivity and porous structure and thus, may decrease a contact resistance with the separating plate.

Also, the gas diffusion layer may be provided in a structure in which a micro porous layer dried after applying a slurry including conductive carbon particles each with a micron size is stacked on the gas diffusion layer. Accordingly, conductivity may be enhanced.

Grafoil indicates a conductive sealing material that uses a carbon material.

Metal foam indicates an elastic conductive product as a member formed using, for example, a metallic thin wire and having a volume.

The first independent cooling plate 131 may include a first refrigerant inflow port 1312 and a first refrigerant outflow port 1313 that are connected to the first refrigerant inflow passage 132 and the first refrigerant outflow passage 133, respectively, and communicate with a refrigerant flow path formed in the first independent cooling plate 131. A refrigerant that flows in through a single first refrigerant inflow passage 132 may be divided and thereby flow in the first refrigerant inflow port 1312 formed in each of the plurality of first independent cooling plates 131, and may remove the heat generated from the cell unit 12 while flowing in each first independent cooling plate 131 and may flow out to a single first refrigerant outflow passage 133 through each first refrigerant outflow port 1313.

The first independent cooling plate 131 may include a first protrusion that does not overlap the cell unit 12 based on a direction (hereinafter, a stacking direction) in which the cell unit 12 is stacked. The first refrigerant inflow port 1312 and the first refrigerant outflow port 1313 may be connected to the first protrusion.

The second independent cooling plate 134 may include a second refrigerant inflow port 1345 and a second refrigerant outflow port 1346 that are connected to the second refrigerant inflow passage 135 and the second refrigerant outflow passage 136, respectively, and communicate with a refrigerant flow path formed in the second independent cooling plate 134. A refrigerant that flows in through a single second refrigerant inflow passage 135 may be divided and thereby flow in the second refrigerant inflow port 1345 formed in each of the plurality of second independent cooling plates 134, and may remove the heat generated from the cell unit 12 while flowing in each second independent cooling plate 134, and may flow out to a single second refrigerant outflow passage 136 through each second refrigerant outflow port 1346.

The second independent cooling plate 134 may include a second protrusion that does not overlap the cell unit 12 based on, for example, the stacking direction of the cell unit 12. The second refrigerant inflow port 1345 and the second refrigerant outflow port 1346 may be connected to the second protrusion. The second protrusion and the first protrusion may not overlap based on the stacking direction of the cell unit 12.

The first refrigerant inflow passage 132, the first refrigerant outflow passage 133, the second refrigerant inflow passage 135, and the second refrigerant outflow passage 136 may be disposed in an elongated shape along the stacking direction of the plurality of cell units 12. The second refrigerant inflow passage 135 and the second refrigerant outflow passage 136 may be disposed on a side that faces the first refrigerant inflow passage 132 and the first refrigerant outflow passage 133.

According to a four-external manifold cooling structure, a refrigerant flowing in a zigzagged form on the opposite side may cool the cell unit 12. Also, by providing a plurality of refrigerant inflow passages and a plurality of refrigerant outflow passages, it is possible to enhance the mobility of the refrigerant compared to a case in which a single refrigerant inflow passage and a single refrigerant outflow passage are provided. Although the example of providing two refrigerant inflow passages and two refrigerant outflow passages is described herein, an example of providing three refrigerant inflow passages and three refrigerant outflow passages may be included in the scope of the disclosure.

Figure 7:
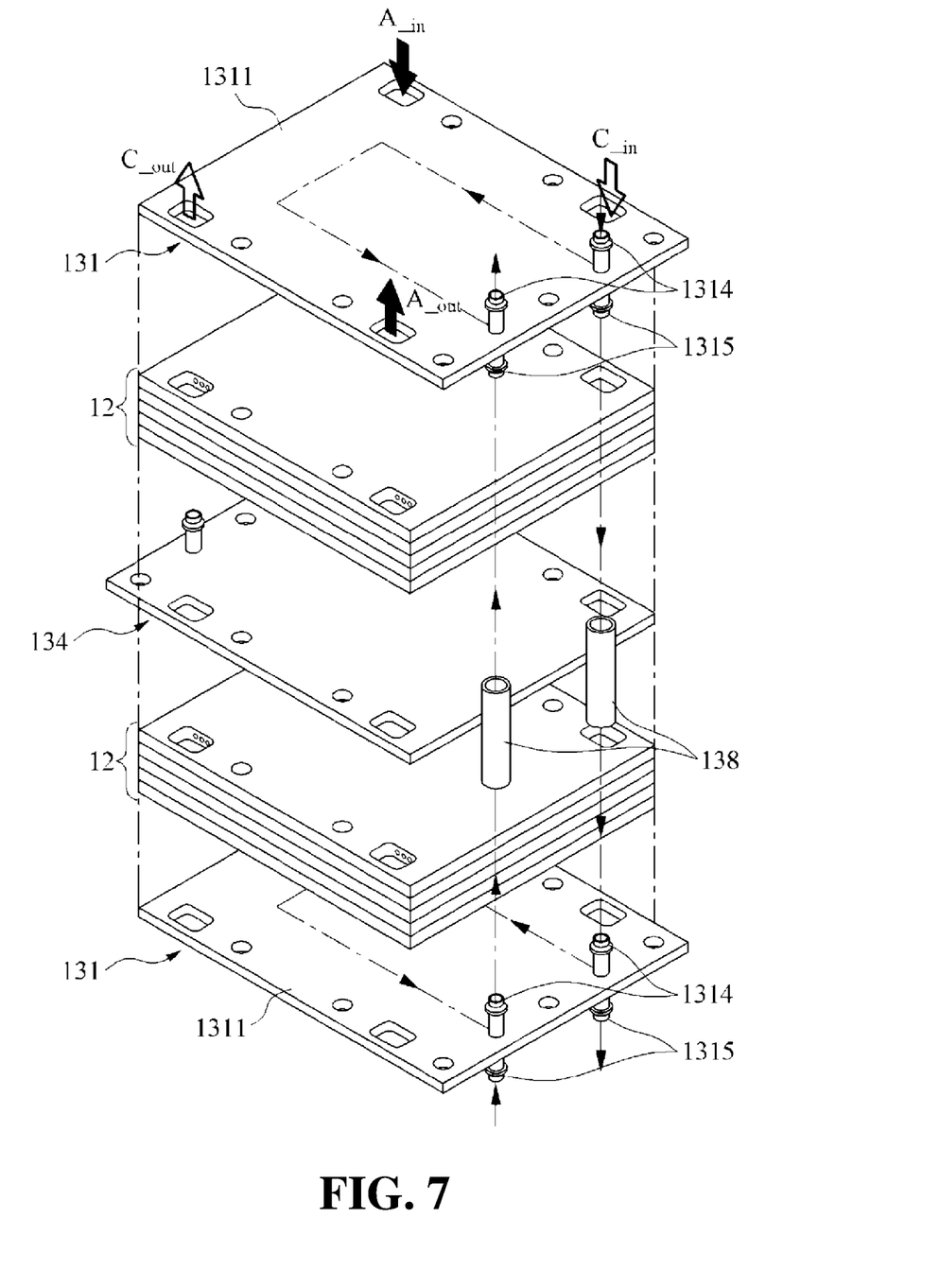
FIG. 7 is an exploded perspective view illustrating a portion of a high-temperature polymer electrolyte membrane fuel cell stack according to an example embodiment.

FIG. 7 is an exploded perspective illustrating a portion of a high-temperature PEMFC stack according to an example embodiment.

Referring to FIG. 7, the cooling assembly 13 (see FIG. 3) of the high-temperature PEMFC stack 10 may further include a refrigerant hose 138 disposed between two adjacent first independent cooling plates 131, and formed using a flexible material.

Each of the two adjacent first independent cooling plates 131 may include a body 1311 in a planar shape, an upper refrigerant port 1314 configured to extend upward from the body 1311, and a lower refrigerant port 1315 configured to extend downward from the body 1311. Here, one of the upper refrigerant ports 1314 may communicate with one of the lower refrigerant ports 1315, and may act as the refrigerant inflow port 1312 (see FIG. 5). Similarly, the other one of the upper refrigerant ports 1314 may communicate with the other one of the lower refrigerant ports 1315, and may act as the refrigerant outflow port 1313 (see FIG. 5).

The refrigerant hose 138 may connect the two adjacent first independent cooling plates 131. That is, the refrigerant hose 138 may connect the lower refrigerant port 1315 of one first independent cooling plate 131 between the two adjacent first independent cooling plates 131 and the upper refrigerant port 1314 of the other first independent cooling plate 131 provided at a location corresponding to a location of the lower refrigerant port 1315. The refrigerant hose 138 may be understood as a single part that constitutes the refrigerant inflow passage 132 and/or the refrigerant outflow passage 133 described above with reference to FIGS. 1 through 6.

Figure 8A:
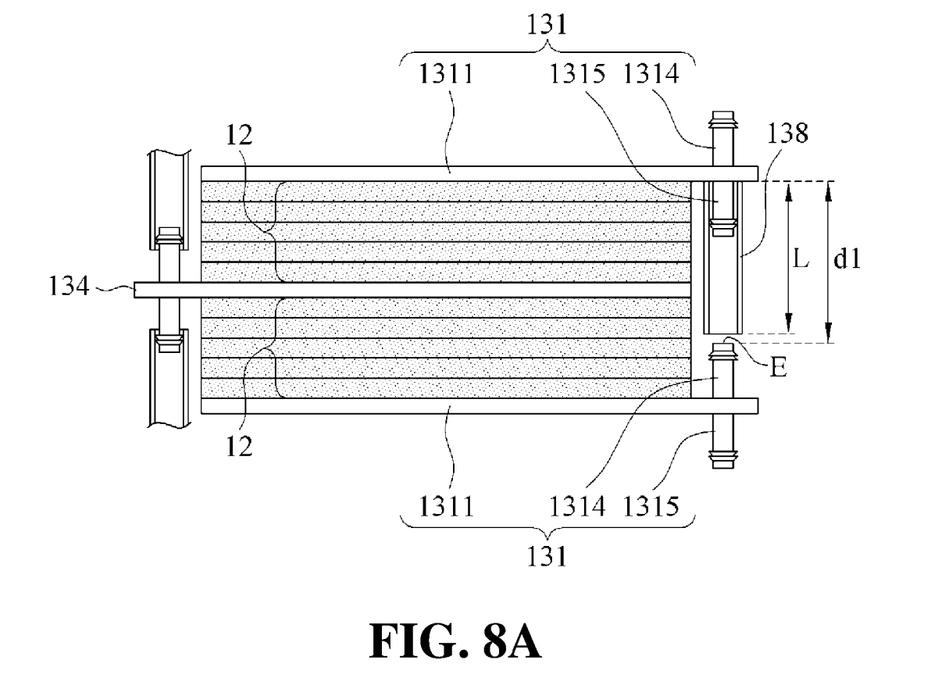
FIGS. 8A and 8B illustrate a process of connecting a refrigerant hose according to an example embodiment.
Figure 8B:
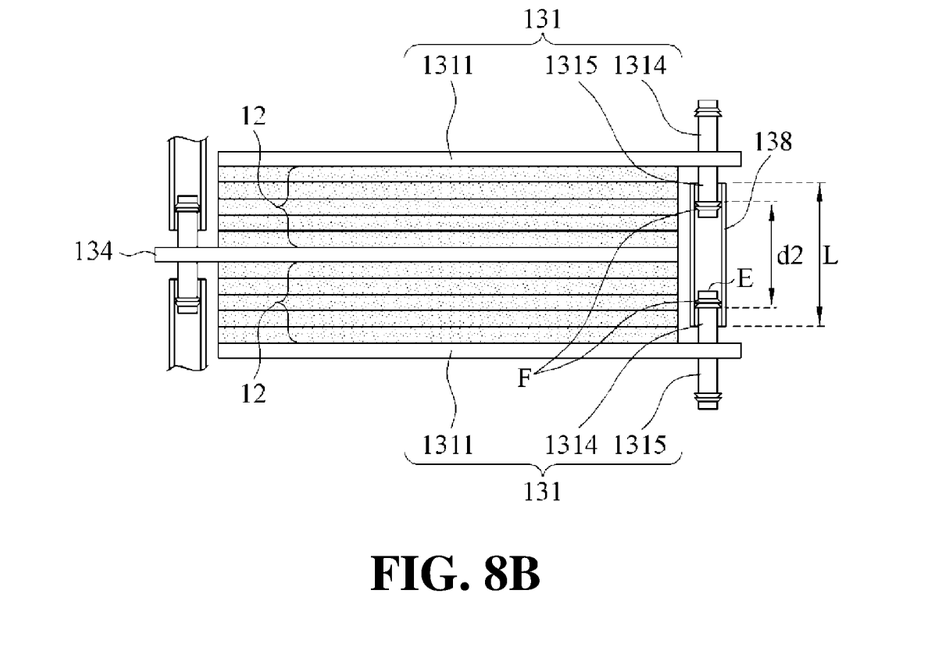

Referring to FIG. 8B, the first independent cooling plate 131 may further include a fixture F provided to each of the upper refrigerant port 1314 and the lower refrigerant port 1315 and configured to fix the refrigerant hose 138. The fixture F may be provided in a shape with a decreasing diameter along a direction in which the upper refrigerant port 1314, the lower refrigerant port 1315 extends from the body 1311. According to the shape, the fixture F enables the refrigerant hose 138 to be easily inserted into the upper refrigerant port 1314, the lower refrigerant port 1315 and to be in tight contact therewith, thereby enhancing a clamping force of the refrigerant hose 138.

Likewise, a flexible refrigerant hose may be disposed between the two adjacent second independent cooling plates 134. Further description is omitted here.

FIGS. 8A and 8B illustrate a process of connecting a refrigerant hose according to an example embodiment.

Referring to FIGS. 8A and 8B, in a state in which the plurality of cell units 12 and the cooling assembly 13 (see FIG. 2) are pressurized by way of the support assembly 11, a distance d1 between the body 1311 of one of the two adjacent first independent cooling plates 131 and an end E of the upper refrigerant port 1314 of the other first independent cooling plate 131 may be greater than a length L of the refrigerant hose 138.

According to the above structure, it is possible to decrease interference by the upper refrigerant port 1314 and to easily mount one end of the refrigerant hose 138 to the lower refrigerant port 1315. As shown in FIG. 8A, by pushing one end of the refrigerant hose 138 into a root portion of the lower refrigerant port 1315, it is possible to align the other end of the refrigerant hose 138 and the upper refrigerant port 1314 on a single straight line. Referring to FIG. 8B, by pushing the other end of the refrigerant hose 138 toward the upper refrigerant port 1314, it is possible to enable the two refrigerant ports, that is, the upper refrigerant port 1314 and the lower refrigerant port 1315 to communicate with the refrigerant hose 138.

In a state in which the plurality of cell units 12 and the cooling assembly 13 are pressurized by way of the support assembly 11, a distance d2 between the fixture F provided to the lower refrigerant port 1315 of one of the two adjacent first independent cooling plates 131 to the fixture F provided to the upper refrigerant port 1314 of the other first independent cooling plate 131 may be less than the length L of the refrigerant hose 138.

According to the above structure, without using an additional connecting device, the two refrigerant ports, that is, the upper refrigerant port 1314 and the lower refrigerant port 1315 may communicate through the refrigerant hose 138. Also, the refrigerant hose 138 is formed using a flexible material. Thus, a stable operation may be achieved without causing damage to a refrigerant flow passage by compensating for a deviation according to expansion and contraction occuring during an operation of the high-temperature PEMFC. Also, although a replacement of the refrigerant flow passage is required due to an external impact or aging, only the refrigerant hose 138 corresponding to a portion to be required may need to be replaced without a need to separate a constituent part of the entire stack. Accordingly, there are advantages in an aspect of a maintenance and repair.

Figure 9:
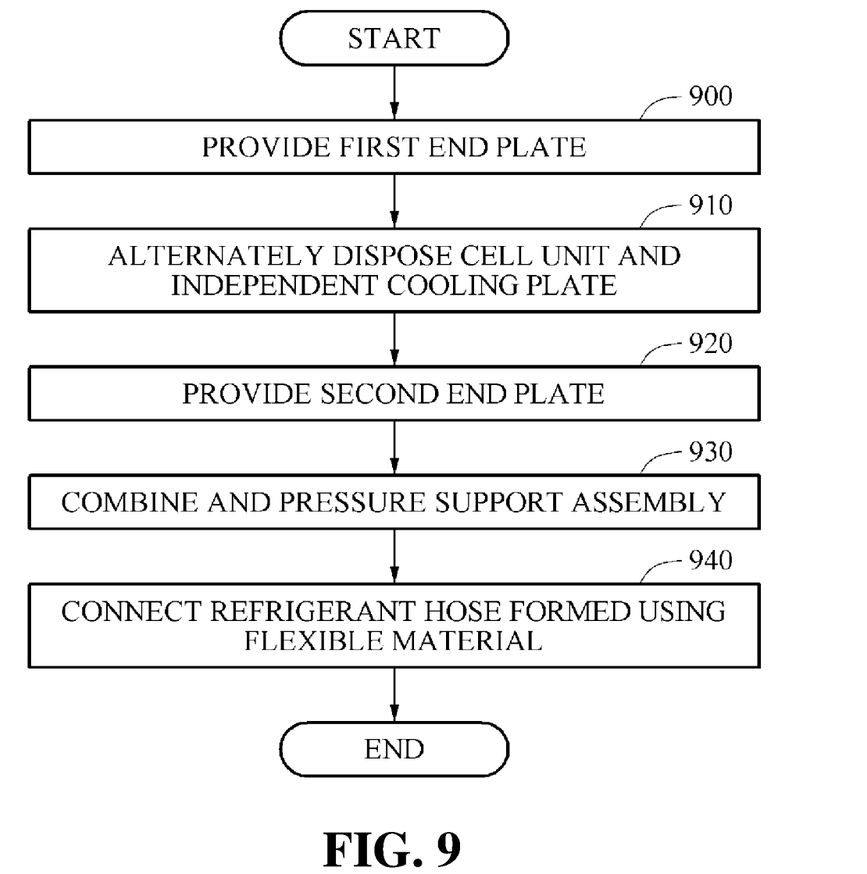
FIG. 9 is a flowchart illustrating a method of producing a high-temperature polymer electrolyte membrane fuel cell stack according to an example embodiment.

FIG. 9 is a flowchart illustrating a method of producing a high-temperature PEMFC stack according to an example embodiment.

Referring to FIG. 9, the method of producing a high-temperature PEMFC stack may include operation 900 of providing a first end plate, operation 910 of alternately disposing, on the first end plate, a plurality of cell units each configured by stacking a plurality of separating plates, and a plurality of independent cooling plates, operation 920 of providing a second end plate after operation 910, operation 930 of combining and pressurizing a support assembly for pressurizing and supporting the first end plate and the second end plate, and operation 940 of connecting a refrigerant hose that connects between a portion of the plurality of independent cooling plates, and formed using a flexible material.

According to example embodiments, dissimilar to forming a refrigerant flow path inside of a separating plate of a fuel cell according to the related art, it is possible to enhance durability by using an independent cooling plate separate from the separating plate. Also, since a refrigerant hose configured to guide a refrigerant to the independent cooling plate may be formed using a flexible material, it is possible to compensate for a deviation according to a volume expansion and contraction occurring during an operation of a high-temperature polymer electrolyte membrane fuel cell, and thereby to further reduce a risk of damage. In addition, it is possible to further simplify assembling of the high-temperature polymer electrolyte membrane fuel cell and, at the same time, to easily maintain and repair the high-temperature polymer electrolyte membrane fuel cell after the assembly.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A high-temperature polymer electrolyte membrane fuel cell stack comprising
    a plurality of cell units;
    a cooling assembly including
        a plurality of first independent cooling plates disposed on top surfaces of the plurality of cell units, respectively;
        a plurality of second independent cooling plates disposed on bottom surfaces of the plurality of cell units, respectively;
        a first refrigerant inflow passage configured to guide a refrigerant that flows into each of the plurality of first independent cooling plates;
        a first refrigerant outflow passage configured to guide a refrigerant that flows out from each of the plurality of first independent cooling plates;
        a second refrigerant inflow passage configured to guide a refrigerant flows into each of the plurality of second independent cooling plates; and
        a second refrigerant outflow passage configured to guide a refrigerant that flows out from each of the plurality of second independent cooling plates;
    a support assembly configured to pressurize and support the plurality of cell units and the cooling assembly, wherein
    the first refrigerant inflow passage and the first refrigerant outflow passage are each disposed in an elongated shape along a direction in which the plurality of cell units is stacked;
    the second refrigerant inflow passage and the second refrigerant outflow passage are each disposed in an elongated shape along the direction in which the plurality of cell units is stacked, and disposed on an opposite side of the plurality of cell units from the first refrigerant inflow passage and the first refrigerant outflow passage;
    the first independent cooling plate includes a first protrusion that does not overlap the cell unit based on a direction in which the cell unit is stacked;
    the first refrigerant inflow passage and the first refrigerant outflow passage are connected to the first protrusion;
    the second independent cooling plate includes a second protrusion that does not overlap the cell unit based on the direction in which the cell unit is stacked;
    the second refrigerant inflow passage and the second refrigerant outflow passage are connected to the second protrusion; and
    the first protrusion and the second protrusion are configured to not overlap based on the direction in which the cell unit is stacked.

2. The high-temperature polymer electrolyte membrane fuel cell stack of claim 1, wherein the cell unit is configured by stacking a plurality of separating plates.

3. The high-temperature polymer electrolyte membrane fuel cell stack of claim 2, wherein each of the plurality of separating plates includes a hydrogen flow path through which hydrogen flows and an air flow path through which air flows, and does not include a refrigerant flow path through which a refrigerant flows.

4. The high-temperature polymer electrolyte membrane fuel cell stack of claim 1, wherein each of the first independent cooling plate and the second independent cooling plate is formed using a metal material having a strength greater than a material of the cell unit.

5. The high-temperature polymer electrolyte membrane fuel cell stack of claim 1, wherein the cooling assembly further includes a refrigerant hose disposed between two adjacent first independent cooling plates and formed using a flexible material.

6. The high-temperature polymer electrolyte membrane fuel cell stack of claim 5, wherein each of the two adjacent first independent cooling plates includes
    a body in a planar shape;
    an upper refrigerant port configured to extend upward from the body; and
    a lower refrigerant port configured to extend downward from the body; and wherein
    the refrigerant hose is configured to connect the lower refrigerant port of one first independent cooling plate and the upper refrigerant port of the other first independent cooling plate between the two adjacent first independent cooling plates.

7. The high-temperature polymer electrolyte membrane fuel cell stack of claim 6, wherein, in a state in which the plurality of cell units and the cooling assembly are pressurized by way of the support assembly, a distance between the body of the one first independent cooling plate and an end of the upper refrigerant port of the other first independent cooling plate is greater than a length of the refrigerant hose.

8. The high-temperature polymer electrolyte membrane fuel cell stack of claim 6, wherein each of the two adjacent first independent cooling plates includes a fixture provided to each of the upper refrigerant port and the lower refrigerant port and configured to fix the refrigerant hose.

9. The high-temperature polymer electrolyte membrane fuel cell stack of claim 8, wherein, in a state in which the plurality of cell units and the cooling assembly are pressurized by way of the support assembly, a distance between the fixture provided to the lower refrigerant port of the one first independent cooling plate and the fixture provided to the upper refrigerant port of the other first independent cooling plate is less than a length of the refrigerant hose.

* * * * *